US012565234B2

(12) United States Patent
Elmahgiubi et al.

(10) Patent No.: US 12,565,234 B2
(45) Date of Patent: Mar. 3, 2026

(54) METHOD AND A SYSTEM FOR GENERATING TRAINING DATA FOR TRAINING A MOTION PLANNER

(71) Applicant: HUAWEI TECHNOLOGIES CO., LTD., Shenzhen (CN)

(72) Inventors: Mohammed Elmahgiubi, Richmond Hill (CA); Ziyu Zhang, Toronto (CA); Kasra Rezaee, Kitchener (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 133 days.

(21) Appl. No.: 18/514,230

(22) Filed: Nov. 20, 2023

(65) Prior Publication Data

US 2025/0162611 A1 May 22, 2025

(51) Int. Cl.
| | |
|---|---|
| *B60W 60/00* | (2020.01) |
| *B60W 50/00* | (2006.01) |
| *G06N 3/044* | (2023.01) |
| *G06N 3/045* | (2023.01) |

(52) U.S. Cl.
CPC ........ *B60W 60/0011* (2020.02); *B60W 50/00* (2013.01); *G06N 3/044* (2023.01); *G06N 3/045* (2023.01); *B60W 2050/0028* (2013.01)

(58) Field of Classification Search
CPC ................. G06N 3/045; B60W 50/00; B60W 2050/0028
See application file for complete search history.

(56) References Cited

U.S. PATENT DOCUMENTS

| | | | |
|---|---|---|---|
| 11,640,562 B1 * | 5/2023 | Badithela | G06N 7/01 |
| | | | 706/12 |
| 12,314,853 B2 * | 5/2025 | Douillard | G06T 7/20 |
| 2022/0396289 A1 * | 12/2022 | Li | G01C 21/3407 |

(Continued)

OTHER PUBLICATIONS

Bansal et al., "ChauffeurNet: Learning to Drive by Imitating the Best and Synthesizing the Worst", retrieved from https://arxiv.org/pdf/1812.03079.pdf on Nov. 8, 2023.

(Continued)

*Primary Examiner* — Hunter B Lonsberry
(74) *Attorney, Agent, or Firm* — BCF LLP

(57) ABSTRACT

A method and server for motion planning of an autonomous vehicle are provided. The method comprises: receiving an original dataset including a plurality of trajectories for the autonomous vehicle, the plurality of trajectories being distributed over a predetermined plurality of behaviors according to an initial distribution; acquiring an indication of a target distribution of the plurality of trajectories over the predetermined plurality of behaviors; determining a difference between the initial and target distributions, thereby identifying behaviors, for which additional trajectories are to be generated for adjusting the initial distribution of the plurality of trajectories to the target distribution; generating, using the plurality of trajectories in the original dataset and the additional trajectories, an augmented dataset having the target distribution of trajectories over the predetermined plurality of behaviors; and training a motion planner model to simulate motion of the autonomous vehicle based on the augmented plurality of trajectories.

18 Claims, 8 Drawing Sheets

700

RECEIVING AN ORIGINAL DATASET INCLUDING A PLURALITY OF TRAJECTORIES FOR THE AUTONOMOUS VEHICLE — 702

ACQUIRING AN INDICATION OF A TARGET DISTRIBUTION OF THE PLURALITY OF TRAJECTORIES OVER THE PREDETERMINED PLURALITY OF BEHAVIORS — 704

DETERMINING A DIFFERENCE BETWEEN THE INITIAL AND TARGET DISTRIBUTIONS, THEREBY IDENTIFYING THOSE OF THE PREDETERMINED PLURALITY OF BEHAVIORS, FOR WHICH ADDITIONAL TRAJECTORIES ARE TO BE GENERATED FOR ADJUSTING THE INITIAL DISTRIBUTION OF THE PLURALITY OF TRAJECTORIES IN THE ORIGINAL DATASET TO THE TARGET DISTRIBUTION — 706

GENERATING A GIVEN ADDITIONAL TRAJECTORY OF THE ADDITIONAL TRAJECTORIES — 708

GENERATING, USING THE PLURALITY OF TRAJECTORIES IN THE ORIGINAL DATASET AND THE ADDITIONAL TRAJECTORIES, AN AUGMENTED DATASET HAVING THE TARGET DISTRIBUTION OF TRAJECTORIES OVER THE PREDETERMINED PLURALITY OF BEHAVIORS — 710

TRAINING A MOTION PLANNER MODEL TO SIMULATE MOTION OF THE AUTONOMOUS VEHICLE BASED ON THE AUGMENTED DATASET INSTEAD OF THE ORIGINAL DATASET — 712

(56)          References Cited

U.S. PATENT DOCUMENTS

2024/0104934 A1\*   3/2024  Pronovost ............ G06V 10/774
2024/0160888 A1\*   5/2024  Rempe ................... G06N 3/047

OTHER PUBLICATIONS

Zuo et al., "Exploring Imitation Learning for Autonomous Driving with Feedback Synthesizer and Differentiable Rasterization", retrieved from https://arxiv.org/pdf/2103.01882.pdf on Nov. 8, 2023.
Yang et al., "Delving into Deep Imbalanced Regression", retrieved from https://arxiv.org/pdf/2102.09554.pdf on Nov. 8, 2023.
Branco et al., "MOGN: a Pre-processing Approach for Imbalanced Regression", retrieved from https://proceedings.mlr.press/v74/branco17a/branco17a.pdf on Nov. 8, 2023.
Liu et al., "Multiple Style Transfer via Variational Autoencoder", retrieved from https://arxiv.org/pdf/2110.07375.pdf on Nov. 8, 2023.
Huang et al., "Multimodal Trajectory Prediction: A Survey", retrieved from https://arxiv.org/pdf/2302.10463.pdf on Nov. 8, 2023.

\* cited by examiner

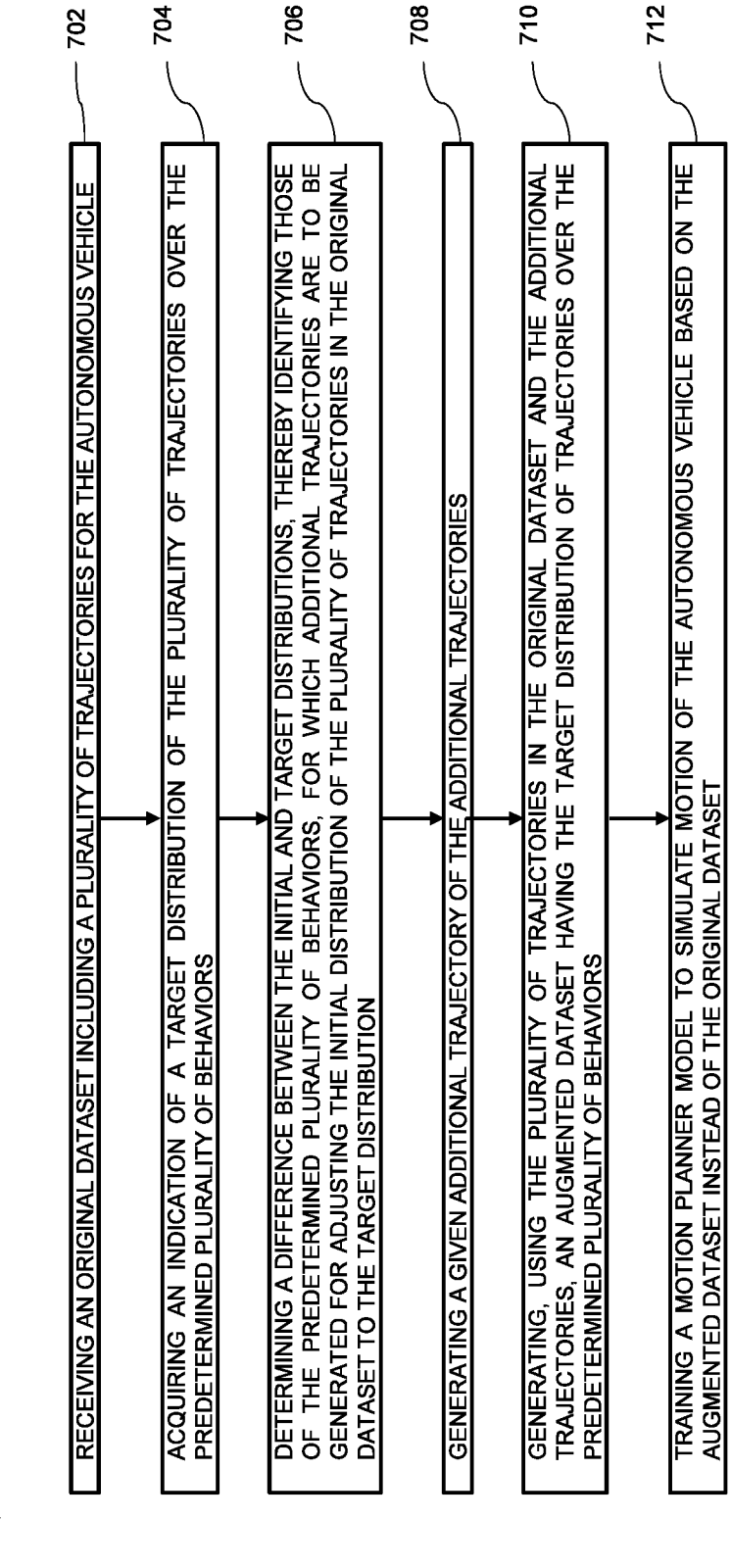

700

702 — RECEIVING AN ORIGINAL DATASET INCLUDING A PLURALITY OF TRAJECTORIES FOR THE AUTONOMOUS VEHICLE

704 — ACQUIRING AN INDICATION OF A TARGET DISTRIBUTION OF THE PLURALITY OF TRAJECTORIES OVER THE PREDETERMINED PLURALITY OF BEHAVIORS

706 — DETERMINING A DIFFERENCE BETWEEN THE INITIAL AND TARGET DISTRIBUTIONS, THEREBY IDENTIFYING THOSE OF THE PREDETERMINED PLURALITY OF BEHAVIORS, FOR WHICH ADDITIONAL TRAJECTORIES ARE TO BE GENERATED FOR ADJUSTING THE INITIAL DISTRIBUTION OF THE PLURALITY OF TRAJECTORIES IN THE ORIGINAL DATASET TO THE TARGET DISTRIBUTION

708 — GENERATING A GIVEN ADDITIONAL TRAJECTORY OF THE ADDITIONAL TRAJECTORIES

710 — GENERATING, USING THE PLURALITY OF TRAJECTORIES IN THE ORIGINAL DATASET AND THE ADDITIONAL TRAJECTORIES, AN AUGMENTED DATASET HAVING THE TARGET DISTRIBUTION OF TRAJECTORIES OVER THE PREDETERMINED PLURALITY OF BEHAVIORS

712 — TRAINING A MOTION PLANNER MODEL TO SIMULATE MOTION OF THE AUTONOMOUS VEHICLE BASED ON THE AUGMENTED DATASET INSTEAD OF THE ORIGINAL DATASET

FIG. 7

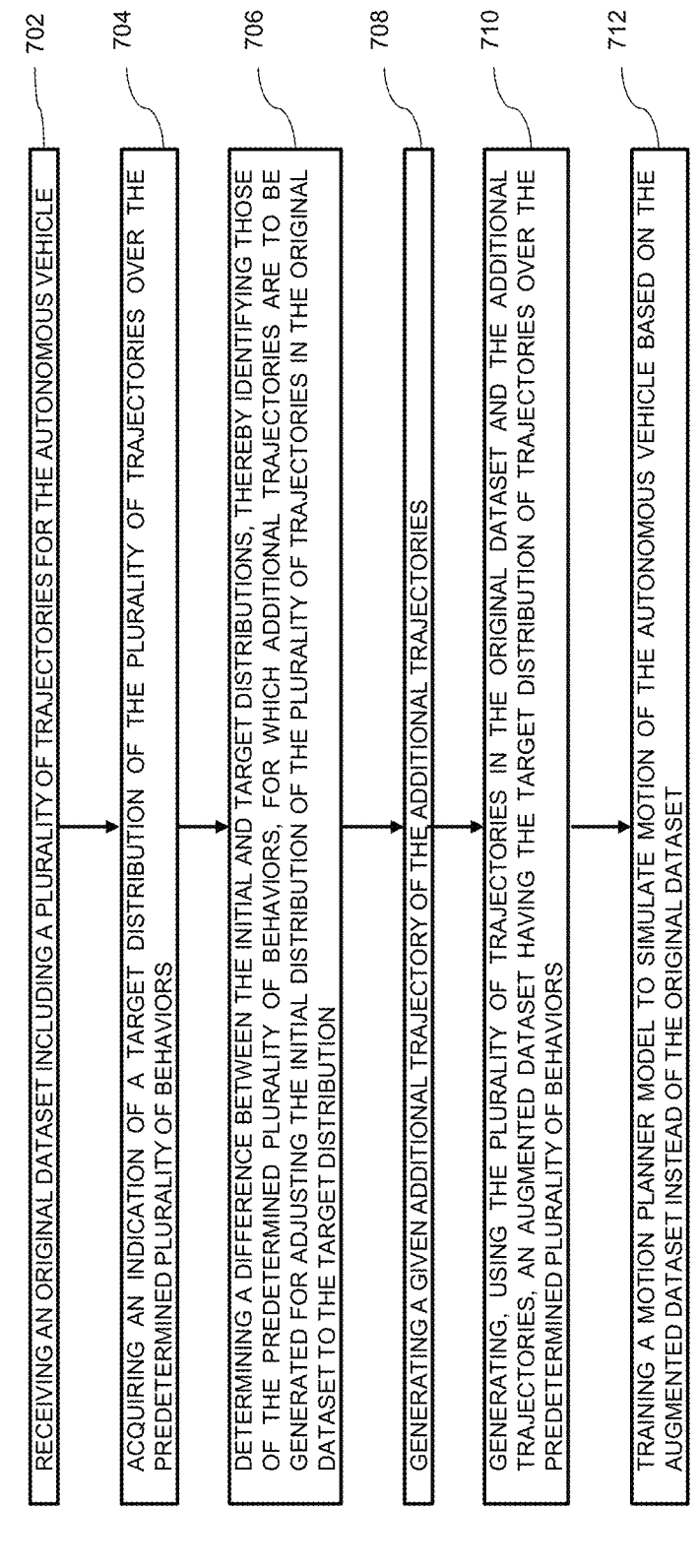

700

702 — RECEIVING AN ORIGINAL DATASET INCLUDING A PLURALITY OF TRAJECTORIES FOR THE AUTONOMOUS VEHICLE

704 — ACQUIRING AN INDICATION OF A TARGET DISTRIBUTION OF THE PLURALITY OF TRAJECTORIES OVER THE PREDETERMINED PLURALITY OF BEHAVIORS

706 — DETERMINING A DIFFERENCE BETWEEN THE INITIAL AND TARGET DISTRIBUTIONS, THEREBY IDENTIFYING THOSE OF THE PREDETERMINED PLURALITY OF BEHAVIORS, FOR WHICH ADDITIONAL TRAJECTORIES ARE TO BE GENERATED FOR ADJUSTING THE INITIAL DISTRIBUTION OF THE PLURALITY OF TRAJECTORIES IN THE ORIGINAL DATASET TO THE TARGET DISTRIBUTION

708 — GENERATING A GIVEN ADDITIONAL TRAJECTORY OF THE ADDITIONAL TRAJECTORIES

710 — GENERATING, USING THE PLURALITY OF TRAJECTORIES IN THE ORIGINAL DATASET AND THE ADDITIONAL TRAJECTORIES, AN AUGMENTED DATASET HAVING THE TARGET DISTRIBUTION OF TRAJECTORIES OVER THE PREDETERMINED PLURALITY OF BEHAVIORS

712 — TRAINING A MOTION PLANNER MODEL TO SIMULATE MOTION OF THE AUTONOMOUS VEHICLE BASED ON THE AUGMENTED DATASET INSTEAD OF THE ORIGINAL DATASET

*FIG. 8*

METHOD AND A SYSTEM FOR GENERATING TRAINING DATA FOR TRAINING A MOTION PLANNER

FIELD

The present technology relates broadly to motion planning; and more specifically, to a method and system for generating training data for training a motion planner model for simulating motion of an autonomous vehicle.

BACKGROUND

Training data for training a given motion planner typically comprises data of various trajectories, along which a given vehicle has driven. Typically such data can include 2D or 3D images representative of a geometry of a given trajectory and surroundings of the given vehicle along the given trajectory. Generating these training data such that the motion planner model is capable of comprehensively simulating the motion of the autonomous vehicle can be tedious and costly. In particular, for quality simulations, the motion planner model requires data diversity, that is, training trajectories of various behaviours, without being biased towards any of them. As a result, the higher costs of generating the training data can be associated with generating training trajectories and labelling them in accordance with their associated behaviors, such as by human assessors. And the cost of generating the training data consequently increases with the increases of behaviors, for which the training trajectories have been acquired. Furthermore, obtaining some training data from real-life settings, such as that representative of near-collision situations associated with the given vehicle, can be pose additional technical challenges.

Certain prior art approaches have been proposed to address the above-identified technical problem.

An article entitled "*ChauffeurNet: Learning to Drive by Imitating the Best and Synthesizing the Worst*", authored by Bansal et al., and published by Robotics: Science and Systems in June 2019, discloses generating synthesized trajectories by injecting perturbations to the trajectories obtained from expert driving.

An article entitled "*Exploring Imitation Learning for Autonomous Driving with Feedback Synthesizer and Differentiable Rasterization*", authored by Zhou et al., and published by at arxiv.org in March 2021, discloses a random feedback synthesizer that augments the demonstration data by synthesizing perturbations to the trajectories.

An article entitled "*Delving into Deep Imbalanced Regression*", authored by Yang et al., and published by at arxiv.org in May 2021, discloses addressing imbalanced data by learning from such imbalanced data with continuous targets, dealing with potential missing data for certain target values, and generalizing to the entire target range a random feedback synthesizer that augments the demonstration data by synthesizing perturbations to the trajectories.

An article entitled "*SMOGN: a Pre-processing Approach for Imbalanced Regression*", authored by Branco et al., and published in the Proceedings of the First International Workshop on Learning with Imbalanced Domains: Theory and Applications in September 2017, discloses dealing with imbalanced domains by combining random under-sampling with two over-sampling techniques: SmoteR and introduction of Gaussian Noise.

An article entitled "*Multiple Style Transfer Via Variational Autoencoder*", authored by Liu et al., and published by Ecole Polytechnique, CNRS, IP Paris in October 2021, discloses ST-VAE, a Variational AutoEncoder for latent space-based style transfer that performs multiple style transfer by projecting nonlinear styles to a linear latent space, enabling to merge styles via linear interpolation before transferring the new style to the content image.

SUMMARY

It is an object of the present technology to ameliorate at least one inconvenience associated with the prior art.

Embodiments of the present technology have been developed based on developers' appreciation of shortcomings associated with the prior art. More specifically, the developers of the present technology have realized that the problem of imbalanced training data can be more effectively addressed if a number of missing trajectories for each of the behaviors could be estimated, and further accurately generated, such that the training data included trajectories that are more consistently distributed over the behaviors. To that end, according to certain non-limiting embodiments of the present technology, the behaviors associated with the trajectories of the training data can be mapped in a behavior feature space. Further, in at least some non-limiting embodiments of the present technology, the so mapped behaviors can be clustered, and an initial distribution of the training trajectories of the training data set over the behaviors is determined.

Then, an indication of a desired distribution (or otherwise "target distribution") of the trajectories over the behaviors is acquired so as to minimize an imbalance between the trajectories and their respective behaviors. For example, the target distribution can be a more uniform distribution of the trajectories over the behaviors, which allows the motion planner model to be trained to simulate the motion of the autonomous vehicle without being biased towards a particular behavior.

Thus, knowing a difference between the desired and initial distributions of the trajectories over the behaviors, it can be possible to determine for which behaviors additional trajectories need to be generated for adjusting the initial distribution to the target distribution of the trajectories, thereby generating an augmented plurality of trajectories. According to certain non-limiting embodiments of the present technology, for generating the additional trajectories, the present methods and systems can include using a multimodal trajectory prediction model configured to generate trajectories based on input 3D scenes and desired behaviors.

Thus, the present methods and systems allows for a deterministic approach of addressing the imbalanced training data for training the motion planner model, that is, generating additional trajectories specifically for those behaviors that are missing for attaining the desired distribution. By doing so, the present methods and systems may enable to generate more quality training data, based on which the motion planner model can be trained to simulate the motion of the vehicle more comprehensively. This can enable to model more hypothetical traffic scenarios of navigating the vehicle, allowing mitigating risks of accidents thereof or improving its passengers' comfort, as an example.

More specifically, in accordance with a first broad aspect of the present technology, there is provided a computer-implemented method for motion planning of an autonomous vehicle. The method comprises: receiving an original dataset including a plurality of trajectories for the autonomous vehicle, a given trajectory of the plurality of trajectories being associated with a respective behavior of a predetermined plurality of behaviors; the plurality of trajectories being distributed over the predetermined plurality of behaviors in the original dataset according to an initial distribution; acquiring an indication of a target distribution of the plurality of trajectories over the predetermined plurality of behaviors;

determining a difference between the initial and target distributions, thereby identifying those of the predetermined plurality of behaviors, for which additional trajectories are to be generated for adjusting the initial distribution of the plurality of trajectories in the original dataset to the target distribution; generating a given additional trajectory of the additional trajectories by: acquiring an indication of a 3D scene for simulating motion of the autonomous vehicle along the given additional trajectory; and feeding the indication of the 3D scene along with an indication of one of the predetermined plurality of behaviors associated with the given additional trajectory to a predictive model, the predictive model has been pre-trained, based on the plurality of trajectories, to generate trajectories for input 3D scenes and one of the predetermined plurality of behaviors; generating, using the plurality of trajectories in the original dataset and the additional trajectories, an augmented dataset having the target distribution of trajectories over the predetermined plurality of behaviors; and training a motion planner model to simulate motion of the autonomous vehicle based on the augmented dataset instead of the original dataset.

In some implementations of the method, the method further comprises pre-training the predictive model, the pre-training comprising: generating a training set of data including a plurality of training digital objects, a given training digital object of which includes: (i) a training 3D scene; (ii) an indication of a desired training behavior; and (iii) a respective label including the given trajectory of the plurality of trajectories from the original dataset; feeding the given training digital object of the plurality of training digital objects to the predictive model; and minimizing, at a current training iteration, a difference between a predicted trajectory and the respective label.

In some implementations of the method, the predictive model comprises a Transformer-based model.

In some implementations of the method, prior to the using the generating the augmented dataset, the method further comprises: analyzing the given additional trajectory to determine whether the given additional trajectory conforms to a plurality of quality rules; in response to determining that the given additional trajectory conforms to each one of the plurality of quality rules, using the given additional trajectory for the generating the augmented dataset; and in response to the given additional trajectory not conforming to at least one of the plurality of quality rules, removing the given additional trajectory from further consideration.

In some implementations of the method, the plurality of quality rules includes rules that are indicative of at least one of: (i) traffic safety of the given additional trajectory; (ii) kinematic feasibility of the given additional trajectory; and (iii) whether the given additional trajectory includes collisions of the autonomous vehicle with other objects.

In some implementations of the method, the target distribution has been determined so as to minimize bias of the motion planning model towards one of the predetermined plurality of behaviors.

In some implementations of the method, the acquiring the indication of the target distribution comprises determining the target distribution in accordance with a following equation:

$$freq_i^{new} = \text{dataset size} \cdot \frac{\sqrt{freq_i^{old}}}{\sum_{i=0}^{N} \sqrt{freq_i^{old}}},$$

where $freq_i^{new}$ is a frequency of appearance of trajectories associated with a given behavior of the predetermined plurality of behaviors in the augmented plurality of trajectories;

dataset size is a total number of trajectories in the plurality of trajectories;

$freq_i^{old}$ is a frequency of appearance of trajectories associated with a given behavior of the predetermined plurality of behaviors in the plurality of trajectories; and N is a total number of behaviors in the predetermined plurality of behaviors.

In some implementations of the method, the acquiring the indication of the target distribution comprises determining the target distribution in accordance with a following equation:

$$freq_i^{new} = \frac{\sum_{i=0}^{N} \sqrt{freq_i^{old}}}{\text{dataset size}}.$$

In some implementations of the method, the generating the augmented dataset comprises replacing the given trajectory of the plurality of trajectories with the given additional trajectory.

In some implementations of the method, the generating the augmented dataset comprises adding the given additional trajectory to the plurality of trajectories.

In some implementations of the method, the motion planner model comprises a recurrent neural network (RNN).

In accordance with a second broad aspect of the present technology, there is provided a system for motion planning of an autonomous vehicle. The system comprises at least one processor and at least one non-transitory computer-readable memory storing executable instructions, which, when executed by the at least one processor, cause the system to: receive an original dataset including a plurality of trajectories for the autonomous vehicle, a given trajectory of the plurality of trajectories being associated with a respective behavior of a predetermined plurality of behaviors; the plurality of trajectories being distributed over the predetermined plurality of behaviors in the original dataset according to an initial distribution; acquire an indication of a target distribution of the plurality of trajectories over the predetermined plurality of behaviors; determine a difference between the initial and target distributions, thereby identifying those of the predetermined plurality of behaviors, for which additional trajectories are to be generated for adjusting the initial distribution of the plurality of trajectories in the original dataset to the target distribution; generate a given additional trajectory of the additional trajectories by: acquiring an indication of a 3D scene for simulating motion of the autonomous vehicle along the given additional trajectory; and feeding the indication of the 3D scene along with an indication of one of the predetermined plurality of behaviors associated with the given additional trajectory to a predictive model, the predictive model has been pre-trained, based on the plurality of trajectories, to generate trajectories for input 3D scenes and one of the predetermined plurality of behaviors; generate, using the plurality of trajectories in the original dataset and the additional trajectories, an augmented dataset having the target distribution of trajectories over the predetermined plurality of behaviors; and train a motion planner model to simulate motion of the autonomous vehicle based on the augmented dataset instead of the original dataset.

In some implementations of the system, the at least one processor further causes the system to pretrain the predictive model, by: generating a training set of data including a plurality of training digital objects, a given training digital object of which includes: (i) a training 3D scene; (ii) an indication of a desired training behavior; and (iii) a respective label including the given trajectory of the plurality of trajectories from the original dataset; feeding the given training digital object of the plurality of training digital objects to the predictive model; and minimizing, at a current training iteration, a difference between a predicted trajectory and the respective label.

In some implementations of the system, the predictive model comprises a Transformer-based model.

In some implementations of the system, prior to the using the generating the augmented dataset, the at least one processor further causes the system to: analyze the given additional trajectory to determine whether the given additional trajectory conforms to a plurality of quality rules; in response to determining that the given additional trajectory conforms to each one of the plurality of quality rules, use the given additional trajectory for the generating the augmented dataset; and in response to the given additional trajectory not conforming to at least one of the plurality of quality rules, remove the given additional trajectory from further consideration.

In some implementations of the system, the plurality of quality rules includes rules that are indicative of at least one of: (i) traffic safety of the given additional trajectory; (ii) kinematic feasibility of the given additional trajectory; and (iii) whether the given additional trajectory includes collisions of the autonomous vehicle with other objects.

In some implementations of the system, the target distribution has been determined so as to minimize bias of the motion planning model towards one of the predetermined plurality of behaviors.

In some implementations of the system, to acquire the indication of the target distribution, the at least one processor causes the system to determine the target distribution in accordance with a following equation:

$$freq_i^{new} = \text{dataset size} \cdot \frac{\sqrt{freq_i^{old}}}{\sum_{i=0}^{N} \sqrt{freq_i^{old}}},$$

where $freq_i^{new}$ is a frequency of appearance of trajectories associated with a given behavior of the predetermined plurality of behaviors in the augmented plurality of trajectories;

dataset size is a total number of trajectories in the plurality of trajectories;

$freq_i^{old}$ is a frequency of appearance of trajectories associated with a given behavior of the predetermined plurality of behaviors in the plurality of trajectories; and N is a total number of behaviors in the predetermined plurality of behaviors.

In some implementations of the system, to acquire the indication of the target distribution, the at least one processor causes the system to determine the target distribution in accordance with a following equation:

$$freq_i^{new} = \frac{\sum_{i=0}^{N} \sqrt{freq_i^{old}}}{\text{dataset size}}.$$

In some implementations of the system, to generate the augmented dataset, the at least one processor causes the system to add the given additional trajectory to the plurality of trajectories.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein. It is contemplated that the user device and the server can be implemented as a same single entity.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context), firmware, hardware, or a combination thereof, that is both necessary and sufficient to achieve the specific function(s) being referenced.

In the context of the present specification, the expression "computer usable information storage medium" or "computer-readable medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "data domain" denotes broadly a collection of values that a data element may include in a particular setting. For example, if the data is image data, such as a 2D image or a 3D point cloud, the data domain may refer to a range of values a given pixel of the 2D image or a given point of the 3D point cloud may have, for example, in a given geographical location (such as a street, a district, a city, a country, and the like), in a given weather condition (such as cloudy, rainy, sunny, and the like), or a combination of both. In another example, the data domain may refer to a range of values the given pixel or the given point may have in a respective one of the 2D image and the 3D point cloud having been generated by a particular image sensor. In other words, in the context of the present specification, 3D point clouds generated by different LiDAR sensors are of different data domains.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 7 depicts a schematic diagram of a method for motion planning of an autonomous vehicle, in accordance with certain non-limiting embodiments of the present technology.

Figure 1:
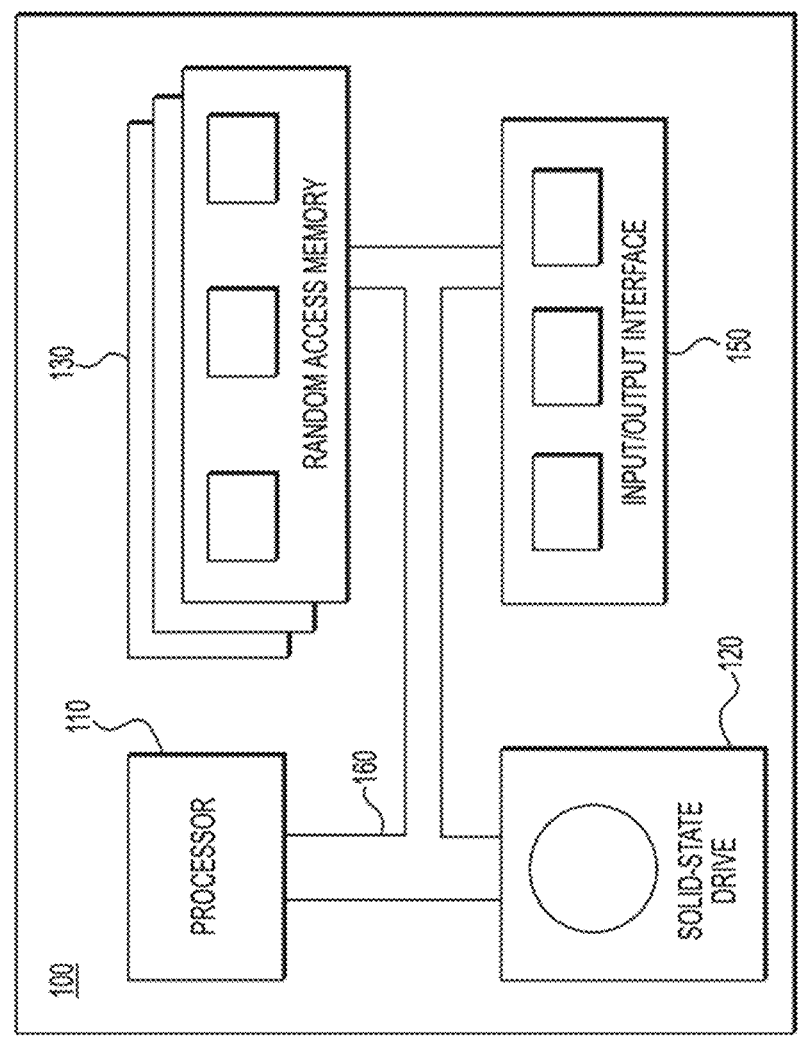
FIG. 1 depicts a schematic diagram of a computer system that can be used for implementing certain non-limiting embodiments of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagram herein represents conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labelled as a "processor" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Computing Environment

FIG. 1 illustrates a diagram of a computing environment 100 in accordance with an embodiment of the present technology is shown. In some embodiments, the computing environment 100 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a random-access memory 130 and an input/output interface 150.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random-access memory 130 and executed by the processor 110 for executing operating data centers based on a generated machine learning pipeline. For example, the program instructions may be part of a library or an application.

In some embodiments of the present technology, the computing environment 100 may be implemented as part of a cloud computing environment. Broadly, a cloud computing environment is a type of computing that relies on a network of remote servers hosted on the internet, for example, to store, manage, and process data, rather than a local server or personal computer. This type of computing allows users to access data and applications from remote locations, and provides a scalable, flexible, and cost-effective solution for data storage and computing. Cloud computing environments can be divided into three main categories:

Infrastructure as a Service (IaaS), Platform as a Service (PaaS), and Software as a Service (SaaS). In an IaaS environment, users can rent virtual servers, storage, and other computing resources from a third-party provider, for example. In a PaaS environment, users have access to a platform for developing, running, and managing applications without having to manage the underlying infrastructure. In a SaaS environment, users can access pre-built software applications that are hosted by a third-party provider, for example. In summary, cloud computing environments offer a range of benefits, including cost savings, scalability, increased agility, and the ability to quickly deploy and manage applications.

Data Generating Pipeline

Figure 2:
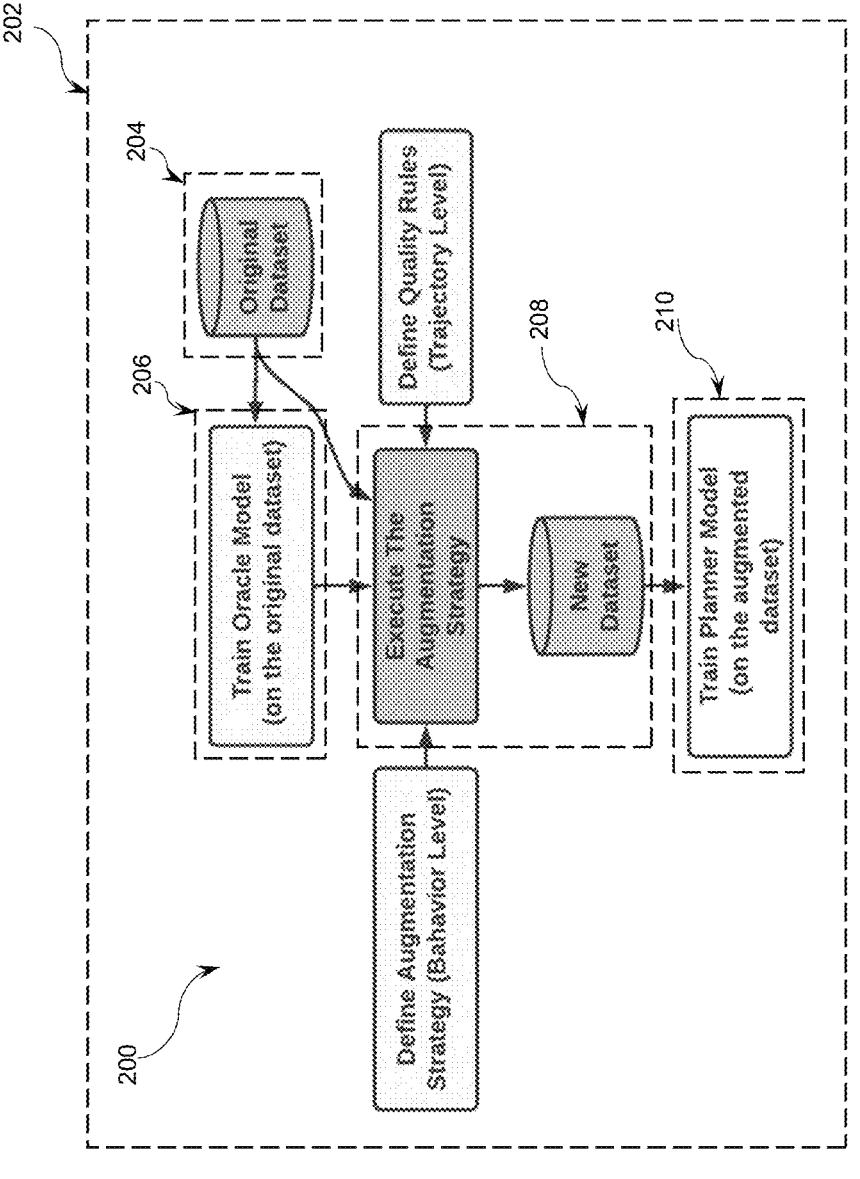
FIG. 2 depicts a schematic diagram of a data generating pipeline configured to generate trajectories for navigating autonomous vehicles, in accordance with certain non-limiting embodiments of the present technology.

With reference to FIG. 2, there is depicted a schematic diagram of a data generating pipeline 200 configured to generate trajectories for navigating autonomous vehicles, in accordance with certain non-limiting embodiments of the present technology.

According to certain non-limiting embodiments of the present technology, the data generating pipeline can be executed by a server 202 (not separately depicted). In some embodiments of the present technology, the server 202 is implemented as a computer server and could thus include some or all of the components of the computing environment 100 of FIG. 1. In one non-limiting example, the server 202 is implemented as a Dell™ PowerEdge™ Server running the Microsoft™ Windows Server™ operating system, but can also be implemented in any other suitable hardware, software, and/or firmware, or a combination thereof. In some non-limiting embodiments of the present technology, the server 202 can be a single server. In alternative non-limiting embodiments of the present technology, the functionality of the server 202 may be distributed and may be implemented via multiple servers.

According to certain non-limiting embodiments of the present technology, as will become apparent from the description provided hereinbelow, the server 202 can be configured to host (or otherwise execute) machine-learning models, such as a predictive model and a motion planner model (both not depicted). Broadly speaking, the predictive model is configured to generate data indicative of trajectories for navigating vehicles, such as autonomous or semi-autonomous vehicles, also known as self-driving cars. According to certain non-limiting embodiments of the present technology, the predictive model can be implemented as multimodal trajectory prediction model, and can be based on one of the following machine-learning architectures: a Generative Adversarial Neural Network (GANN), a Conditional Variational Autoencoder (CVAE), a Denoise Diffusion Probabilistic Model (DDPM), and a Transformer-based neural network. Examples of the predictive model implemented based on one of these machine-learning architectures are described in an article "*Multimodal Trajectory Prediction: A Survey*," authored by Huang et al. and published by School of Computer Science and Engineering, University of New South Wales, Sydney, Australia in February 2023; the content of which is incorporated herein by reference in its entirety. How the predictive model is trained to generate various trajectories will be described below.

Further, according to certain non-limiting embodiments of the present technology, the motion planner model is a machine-learning model configured to simulate motion of the autonomous vehicle along an input trajectory. In some non-limiting embodiments of the present technology, the motion planner model can be implemented as a recurrent neural network (RNN). In these embodiments it can be trained, for example, as described in the article authored by Bansal et al. mentioned above, the content of which is incorporated herein by reference in its entirety.

According to certain non-limiting embodiments of the present technology, the data generating pipeline 200 comprises a plurality of procedures including: (1) an original dataset acquiring procedure 204 for training the predictive model; (2) a predictive model training procedure 206, during which the predictive model is trained to generate data indicative of synthetic trajectories; (3) a dataset augmentation procedure 208 including augmenting the original dataset with the synthetic trajectories generated by the predictive model; and (4) a motion planner model training procedure 210, during which the motion planner model is trained to simulation the motion of the autonomous vehicle based on the augmented dataset. These procedures will now be described in greater detail.

Original Dataset Acquiring Procedure

With continued reference to FIG. 2, according to certain non-limiting embodiments of the present technology, via executing the original dataset acquiring procedure 204, the server 202 can be configured to acquire the original dataset including a plurality of trajectories, which can be used for training the motion planner model to simulate the motion of the autonomous vehicle.

According to certain non-limiting embodiments of the present technology, the server 202 can be configured to acquire data of a given trajectory of the plurality of trajectories from past routes executed by a given training vehicle, which can be either an autonomous vehicle or a conventional vehicle operated by a human driver. This data can include: (i) a training scene; and (ii) a graphical indication of the given trajectory in the training scene.

According to certain non-limiting embodiments of the present technology, the training scene can be representative of a surroundings of the given training vehicle. To that end, in some non-limiting embodiments of the present technology, the server 202 can be configured to generate the training scene based on 2D and 3D image data obtained from an imaging system of the given training vehicle. In some non-limiting embodiments of the present technology, the training scene can include data representative of respective trajectories of surrounding objects of the given training vehicle for a certain period in the past. More specifically, if the training scene was acquired for a given moment in past to, the training scene may further include data of the respective trajectory (that is, its geometry and associated kinematic parameters, for example) of a given object therein from a moment $(t_0-h)$ to a moment $(t_0+f)$, where h and f are time constants.

More specifically, in certain non-limiting embodiments of the present technology, the imaging system of the given training vehicle may be configured to capture Red-Green-Blue (RGB) images or a series thereof. The imaging system may comprise camera sensors such as, but not limited to, Charge-Coupled Device (CCD) or Complementary Metal Oxide Semiconductor (CMOS) sensors and/or digital cameras.

Further, according to certain non-limiting embodiments of the present technology, the imaging system may be configured to convert an optical image into an electronic or digital image and may send captured images to a computing unit of the given training vehicle, which is further configured to transmit these data to the server 202, or to directly to the server 202. In some non-limiting embodiments of the present technology, the imaging system may be a single-lens camera providing RGB pictures. In these embodiments, the imaging system can be implemented as a camera of a type available from FLIR INTEGRATED IMAGING SOLUTIONS INC., 12051 Riverside Way, Richmond, BC, V6 W 1K7, Canada. It should be expressly understood that the single-lens camera can be implemented in any other suitable equipment.

Further, in other non-limiting embodiments of the present technology, the imaging system comprises depth sensors configured to acquire RGB-Depth (RGBD) pictures. In yet other non-limiting embodiments of the present technology, the imaging system can include a LiDAR system configured for gathering information about surroundings of the given training vehicle. It is expected that a person skilled in the art would understand the functionality of the LiDAR system, but briefly speaking, a light source of the LiDAR system is configured to send out light beams that, after having reflected off one or more surrounding objects in the sur-roundings of the computer system 10, are scattered back to a receiver of the LiDAR system. The photons that come back to the receiver are collected with a telescope and counted as a function of time. Using the speed of light (~3×108 m/s), the computing unit of the given training vehicle can then calculate how far the photons have traveled (in the round trip). Photons can be scattered back off of many different entities surrounding the given training vehicle.

In a specific non-limiting example, the LiDAR system can be implemented as the LiDAR based sensor that may be of the type available from VELODYNE LiDAR, INC. of 5521 Hellyer Avenue, San Jose, CA 95138, United States of America. It should be expressly understood that the LiDAR system can be implemented in any other suitable equipment.

Other implementations of the imaging system enabling generating 3D point clouds, including, for example, depth sensors, 3D scanners, and other suitable devices are envi-sioned without departing from the scope of the present technology.

Further, in some non-limiting embodiments of the present technology, the data of the given trajectory can include an indication of a behavior, which can be defined either explic-itly or implicitly. In the former case, the indication of behavior associated with the given trajectory can be defined verbally and include one of the following values: (1) a careful behavior; (2) a normal behavior; (3) an aggressive behavior; (4) a distracted behavior; (5) a drowsy behavior; and (6) a substance-influenced behavior. For example, in some non-limiting embodiments of the present technology, such indications of the behavior associated with the given trajectory can be obtained from a human assessor after analyzing a geometry of the given trajectory and/or kine-matic parameters associated therewith, such as, a maximum speed value, a maximum acceleration value, a maximum jerk of the given training vehicle driving along the given trajectory.

Figure 3:
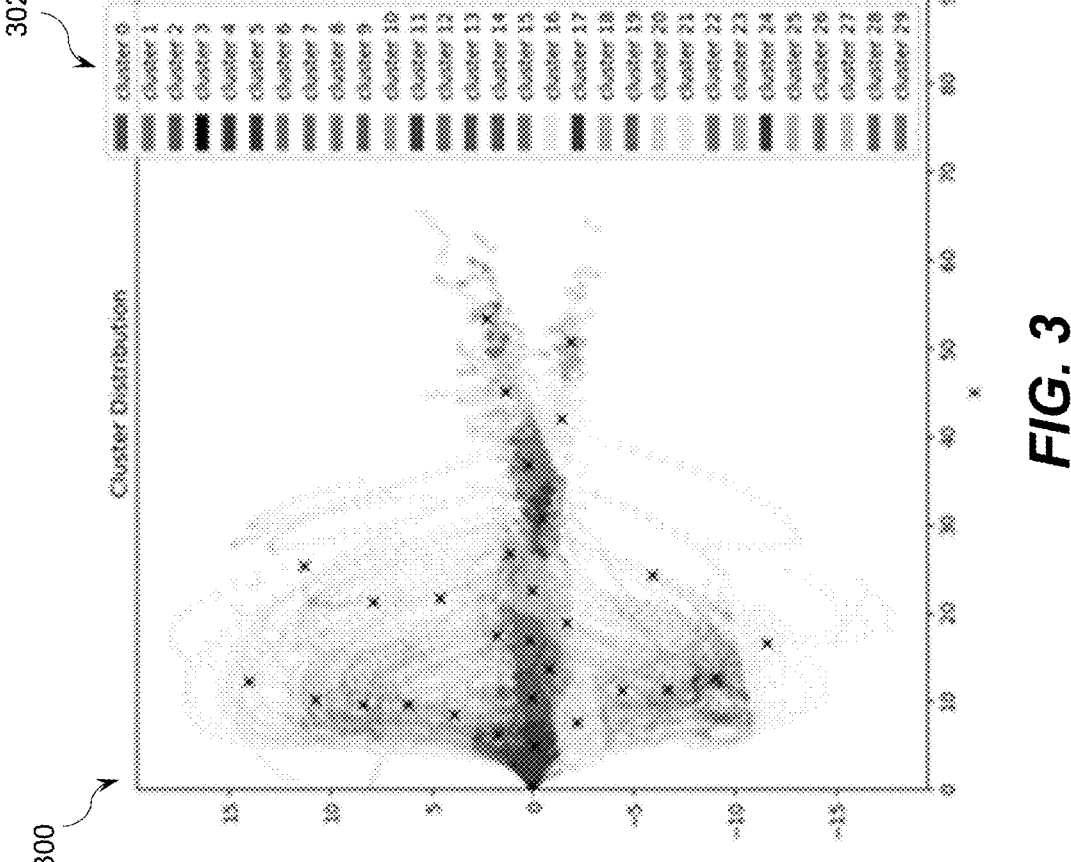
FIG. 3 depicts a schematic illustration of a behavior feature space for defining behavior clusters of a plurality of trajectories, in accordance with certain non-limiting embodiments of the present technology.

By contrast, if the indication of the behavior is defined implicitly, it can include a feature vector embedded in a behavior feature space, such as a behavior feature space 300 schematically depicted in FIG. 3, in accordance with certain non-limiting embodiments of the present technology. More specifically, in some non-limiting embodiments of the pres-ent technology, a feature vector representative of the behav-ior associated with the given trajectory can include values of certain predetermined parameters associated with the given trajectory. Such parameters can include, without limitation, (i) parameters indicative of the geometry of the given trajectory, such as maximum and minimum curvature, a number of curves and kinks, a length of a maximum linear segment, and others; (ii) kinematic parameters mentioned above; and other parameters than can be specific to the given training vehicle and its driver.

Thus, in some non-limiting embodiments of the present technology, using either explicit or implicit indications of behaviors of each one of the plurality of trajectories of the original dataset, the server 202 can be configured to cluster the behaviors into a predetermined plurality of behavioral clusters 302. To that end, the server 202 can be configured to use, for example, a similarity metric, such as a cosine similarity metric.

However, as mentioned hereinabove, the plurality of trajectories can be imbalanced with respect to associated behaviors. In other words, the plurality of trajectories can include significantly more (or fewer) trajectories that are associated with one of the predetermined plurality of behav-ior clusters 302 than with any other one.

Figure 4:
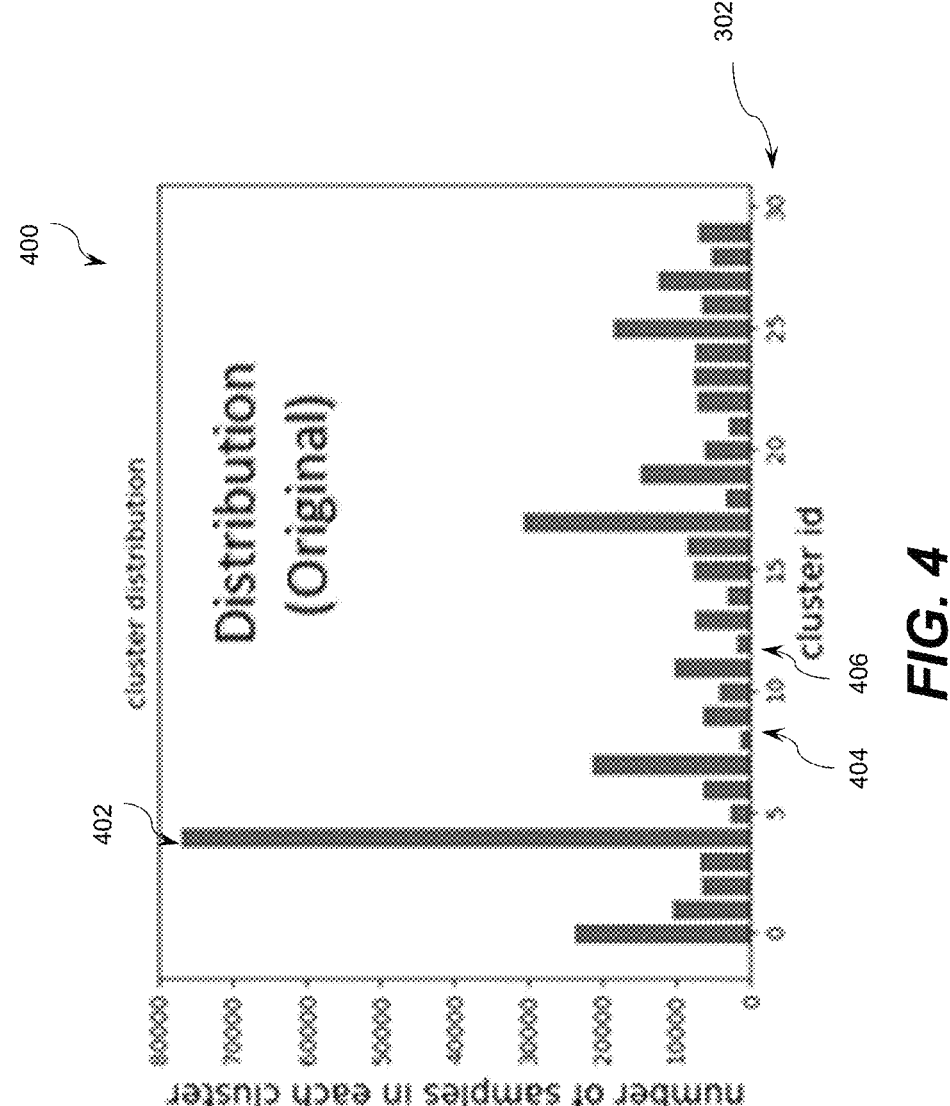
FIG. 4 depicts a histogram of an original distribution of the plurality of trajectories over a predetermined plurality of behavior clusters defined in the behavior feature space of FIG. 3, in accordance with certain non-limiting embodiments of the present technology.

With reference to FIG. 4, there is depicted a histogram of an original distribution 400 of the plurality of trajectories in the original dataset over the predetermined plurality of behavior clusters 302, in accordance with certain non-limiting embodiments of the present technology.

As it can be appreciated, for a first behavior cluster 402, the plurality of trajectories includes considerably more tra-jectories than for other ones of the predetermined plurality of behavior clusters 302. By contrast, for a second behavior cluster 404 and a third behavior cluster 406, the plurality of trajectories includes fewer trajectories than for other behav-ior clusters. Thus, if the server 202 trains the motion planner model to simulate the motion of the autonomous vehicle using the plurality of trajectories from the original dataset, the motion planner model can be biased towards the first behavior cluster 402 without considering other behaviors, such as the second and third behavior clusters 404, 406. This may result in that the motion planned by the so trained motion planner model can be incomplete, incapable of covering certain traffic scenarios, which can lead to acci-dents associated with the autonomous vehicle during real-life operation thereof.

Thus, to balance the original distribution 400 of the plurality of trajectories in the original dataset, according to certain non-limiting embodiments of the present technology, the server 202 can be configured to augment the original dataset. To do so, in some non-limiting embodiments of the present technology, first, the server 202 can be configured to train, based on the original dataset, the predictive model to generate trajectories for desired behavior clusters of the predetermined plurality of behavior clusters 302, which will be described immediately below.

Predictive Model Training Procedure

According to certain non-limiting embodiments of the present technology, to train the predictive model, the server 202 can be configured to execute the predictive model training procedure 206 mentioned above with reference to FIG. 2. More specifically, according to certain non-limiting embodiments of the present technology, the server 202 can be configured to organize the original dataset into a first training set of data, including a plurality of training digital objects, a given training digital object of which includes: (1) the training scene; (2) an indication of a training behavior cluster from the predetermined plurality of behavior clusters 302; and (3) a respective label including the given trajectory of the plurality of trajectories.

Further, in some non-limiting embodiments of the present technology, the server 202 can be configured to feed each one of the first plurality of training digital objects to the predictive model, minimizing, at each training iteration, a difference between a currently predicted trajectory and the respective label including the given trajectory. According to certain non-limiting embodiments of the present technology, the difference between the predictions of the predictive model and the respective labels can be expressed by a loss function. Various non-limiting examples of the loss function include: a Cross-Entropy Loss function, a Mean Squared Error Loss function, a Huber Loss function, a Hinge Loss function, and others. Thus, by doing so, the server 202 can be configured to train the predictive model to generate trajectories for input scenes and desired behavior clusters.

Figure 5:
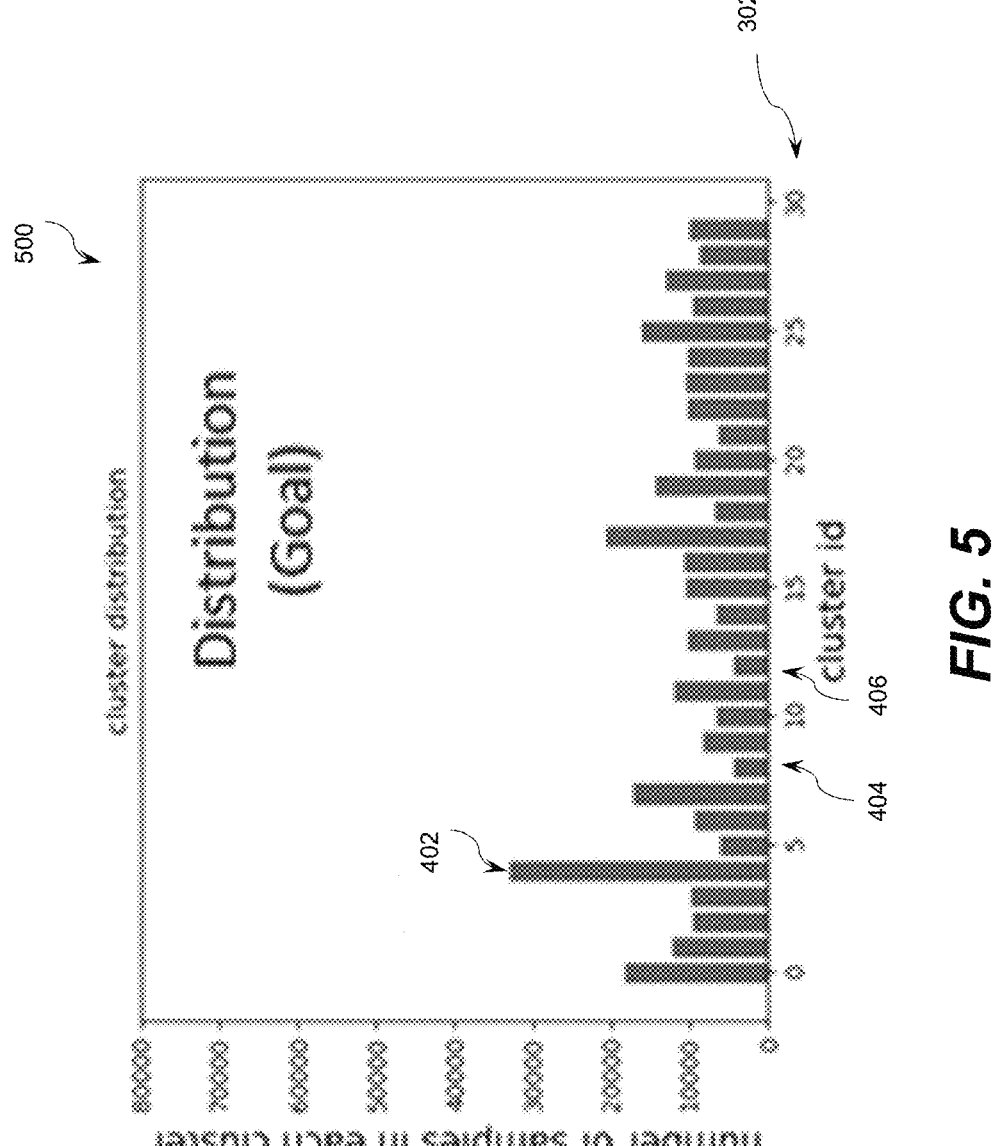
FIG. 5 depicts a histogram of a desired distribution of the plurality of trajectories over the predetermined plurality of behavior clusters of FIG. 3, in accordance with certain non-limiting embodiments of the present technology.

Further, with reference to FIG. 5, according to certain non-limiting embodiments of the present technology, the server 202 can be configured to acquire an indication of a target distribution 500 of trajectories over the predetermined plurality of behavior clusters 302.

As it is best seen from FIG. 5, the target distribution 500 is more uniform than the original distribution 400 of the plurality of trajectories; and even though the first, second, and third behavior clusters 402, 404, 406 still deviate from an average number of trajectories per behavior cluster, they are closer thereto than in the original distribution 400.

In some non-limiting embodiments of the present technology, the target distribution 500 can be determined such that if the motion planner model is trained based on the trajectories distributed according to the target distribution 500, the bias of the motion planner model towards one of the predetermined plurality of behavior clusters 302 is minimized.

In some non-limiting embodiments of the present technology, the server 202 can be configured to determine the target distribution 500 in accordance with a following equation:

$$freq_i^{new} = \text{dataset size} \cdot \frac{\sqrt{freq_i^{old}}}{\sum_{i=0}^{N} \sqrt{freq_i^{old}}}, \quad (1)$$

where $freq_i^{new}$ is a frequency of appearance of trajectories associated with a given behavior cluster of the predetermined plurality of behavior clusters 302 according to the target distribution 500;

dataset size is a total number of trajectories in the plurality of trajectories;

$freq_i^{old}$ is a frequency of appearance of trajectories associated with the given behavior cluster of the predetermined plurality of behavior clusters 302 according to the original distribution 400; and N is a total number of behavior clusters in the predetermined plurality of behavior lusters 302.

In some non-limiting embodiments of the present technology, the server 202 can be configured to determine e target distribution 500 in accordance with a following equation:

$$freq_i^{new} = \frac{\sum_{i=0}^{N} \sqrt{freq_i^{old}}}{\text{dataset size}}. \quad (2)$$

Further, once the server 202 has obtained the indication of the target distribution 500, the server 202 can be configured to determine a difference between the original and target distributions 400, 500. In doing so, the server 202 can be configured to identify those of the predetermined plurality of behavior clusters 302, for which additional trajectories need to be generated to adjust the original distribution 400 of the plurality of trajectories to the target distribution 500.

Data Augmentation Procedure

Once the server 202 has determined the difference between the original and target distributions 400, 500, according to certain non-limiting embodiments of the present technology, the server 202 can be configured to execute the dataset augmentation procedure 208 to generate the additional trajectories for including in an augmented dataset. In some non-limiting embodiments of the present technology, the server 202 can be configured to generate each one of the additional trajectories using the predictive model that has been trained as described above. To do so, the server 202 can be configured to feed, to the predictive model: (i) a scene, within which a given additional trajectory is to extend; and (ii) an indication of a desired behavior cluster of the predetermined plurality of behavior clusters 302, for which the given additional trajectory is to be generated.

In some non-limiting embodiments of the present technology, the server 202 can be configured to: (i) generate the additional trajectories; (ii) add the additional trajectories to the plurality of trajectories, adjusting the numbers of trajectories for each of the predetermined plurality of behavior clusters 302, thereby generating an augmented plurality of trajectories of the augmented dataset having the target distribution 500.

In other non-limiting embodiments of the present technology, using the predictive model, the server 202 can be configured to generate all the trajectories for the augmented plurality of trajectories corresponding to the target distribution 500. In other words, in these embodiments, the server 202 can be configured to synthetically generate every trajectory in the augmented plurality of trajectories.

In some non-limiting embodiments of the present technology, prior to including the given additional trajectory in the augmented plurality of trajectories, the server 202 can be configured to analyze the given additional trajectory to determine if the given additional trajectory conforms to a plurality of quality rules. According to certain non-limiting embodiments of the present technology, the plurality of quality rules can include rules that are indicative of: (i) kinematic feasibility of the given additional trajectory, that is, whether the given additional trajectory is physically feasible or not; (ii) safety of the given additional trajectory, that is, whether the given additional trajectory is associated with excessive safety risks for other road users, which can be defined by kinematic parameters of the autonomous vehicle and a number of maneuvers, as an example; and (iii) presence of collisions with other objects along the given additional trajectory. It should be noted that the above list of quality rules is non-exhaustive, and additional quality rules can be added to the plurality of quality rules. In some non-limiting embodiments of the present technology, additional quality rules can be added to the plurality of quality rules based, for example, on a trade-off between the quality of additional trajectories and a capacity of generation thereof.

Thus, in response to the given additional trajectory conforming to the plurality of quality rules, the server 202 can be configured to add the given additional trajectory to the augmented plurality of trajectories. However, if the given additional trajectory does not conform to at least one of the plurality of quality rules, the server 202 can be configured to reject the given additional trajectory from further consideration.

Figures 6A, 6B:
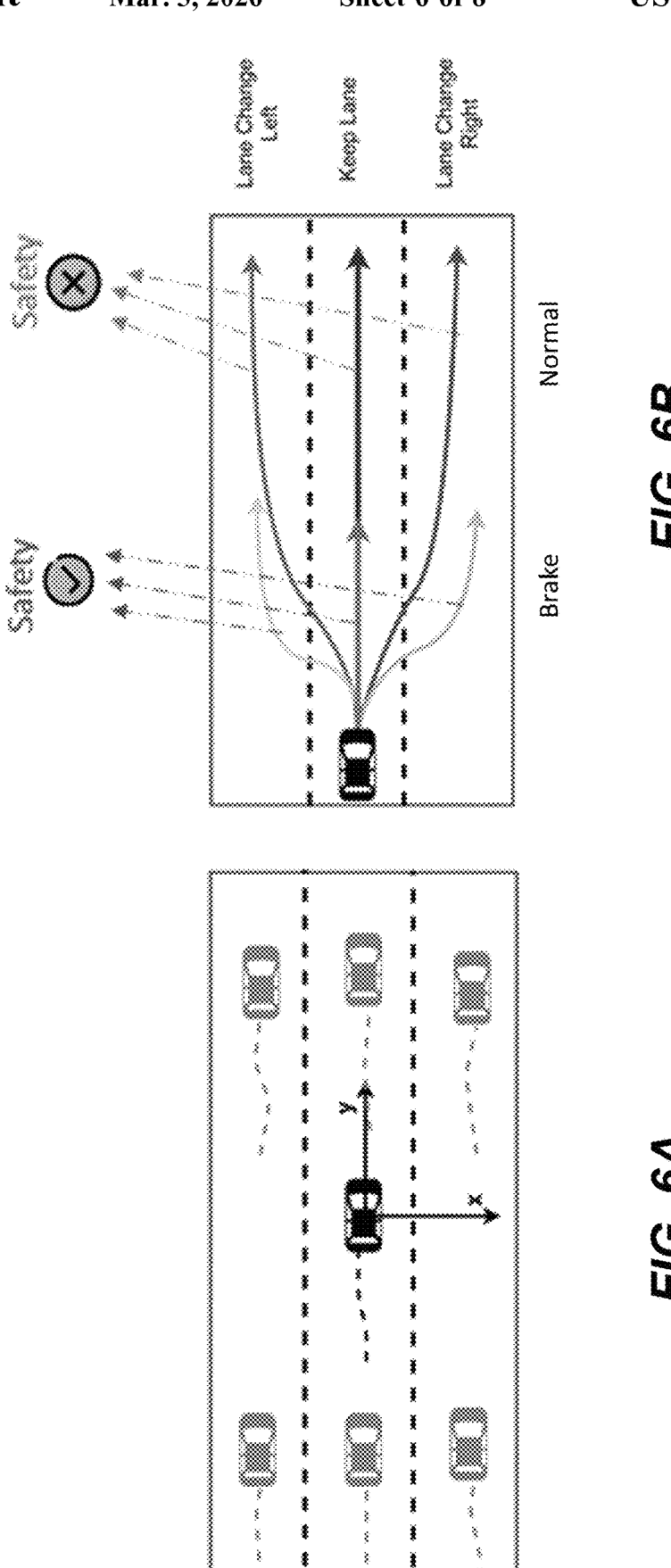
FIG. 6A depicts a schematic diagram an example traffic scenario for a given autonomous vehicle, in accordance with certain non-limiting embodiments of the present technology.
FIG. 6B depicts schematic diagrams of possible trajectories for the given autonomous vehicle to traverse driving in the example traffic scenario of FIG. 6A, in accordance with certain non-limiting embodiments of the present technology.

For example, as it can appreciated from FIG. 6A, schematically depicting a given traffic scenario for the autonomous vehicle, and FIG. 6B, schematically depicting possible additional trajectories for the autonomous vehicle, any additional trajectory that is not associated with braking, be it continuing straight, right lane change, or left lane change, would be associated with increased safety risks (such as a collision with another vehicle) and would thus not conform to the quality rule for safety and be removed from further consideration. By contrast, by applying the plurality of quality rules, the server 202 can be configured to determine that the additional trajectories including braking are safe enough to be included in the augmented plurality of trajectories for further use in training the motion planner model.

Thus, the server 202 can be configured to generate the augmented dataset having the target distribution 500, which is more balanced than the original distribution 400, hence allowing for a more quality training of the motion planner model, which will be described immediately below.

Motion Planner Model Training Procedure

Once the server 202 has generated the augmented dataset, the server 202 can be configured to use it for training the motion planner model to simulate the motion of the autonomous vehicle via executing the motion planner model training procedure 210, which can be executed as described in the article of Bansal et al., mentioned above.

Thus, the server 202 can now be configured to use the motion planner model trained as described above based on the augmented plurality of trajectories to simulate the motion of the autonomous vehicle, which allows modelling more traffic scenarios with higher quality than based on the plurality of trajectories of the original dataset.

Computer-Implemented Method

Given the examples and architecture described above, it is possible to implement a method for motion planning of the autonomous vehicle. With reference to FIG. 7, there is depicted a flowchart diagram of a method 700, in accordance with certain non-limiting embodiments of the present technology. In some non-limiting embodiments of the present technology, the method 700 can be executed by the server 202.

Step 702: Receiving an Original Dataset Including a Plurality of Trajectories for the Autonomous Vehicle At step 702, according to certain non-limiting embodiments of the present technology, the server 202 can be configured to acquire the original dataset by executing the original dataset acquiring procedure 204 described above. According to certain non-limiting embodiments of the present technology, the original dataset can include the plurality of trajectories distributed over the predetermined plurality of behavioral clusters 302 according to the original distribution 400.

In some non-limiting embodiments of the present technology, the server 202 can be configured to execute the predictive model training procedure 206 to train, based on the original dataset, the predictive model to generate trajectories for desired behavior clusters of the predetermined plurality of behavior clusters 302, as described further above.

The method 700 hence advances to step 704.

Step 704: Acquiring an Indication of a Target Distribution of the Plurality of Trajectories Over the Predetermined Plurality of Behaviors At step 704, according to certain non-limiting embodiments of the present technology, the server 202 can be configured to acquire an indication of the target distribution 500 of trajectories over the predetermined plurality of behavior clusters 302, as mentioned above with reference to FIG. 5.

As it can be appreciated from FIG. 5, the target distribution 500 is more uniform than the original distribution 400 of the plurality of trajectories. In some non-limiting embodiments of the present technology, the server 202 can be configured to determine the target distribution 500 in accordance with one of Equation (1) and Equation (2).

The method 700 hence advances to step 706.

Step 706: Determining a Difference Between the Initial and Target Distributions, Thereby Identifying Those of the Predetermined Plurality of Behaviors, for which Additional Trajectories are to be Generated for Adjusting the Initial Distribution of the Plurality of Trajectories in the Original Dataset to the Target Distribution At step 706, according to certain non-limiting embodiments of the present technology, the server 202 can be configured to determine a difference between the original and target distributions 400, 500. In doing so, the server 202 can be configured to identify those of the predetermined plurality of behavior clusters 302, for which additional trajectories need to be generated to adjust the original distribution 400 of the plurality of trajectories to the target distribution 500.

The method 700 hence advances to step 708.

Step 708: Generating a Given Additional Trajectory of the Additional Trajectories At step 708, according to certain non-limiting embodiments of the present technology, the server 202 can be configured to execute the dataset augmentation procedure 208, described in detail above, to generate the additional trajectories for including in the augmented dataset. In some non-limiting embodiments of the present technology, the server 202 can be configured to generate each one of the additional trajectories using the trained predictive model.

The method 700 thus proceeds to step 710.

Step 710: Generating, Using the Plurality of Trajectories in the Original Dataset and the Additional Trajectories, an Augmented Dataset Having the Target Distribution of Trajectories Over the Predetermined Plurality of Behaviors At step 710, according to certain non-limiting embodiments of the present technology, using the additional trajectories, the server 202 can be configured to generate the augmented dataset.

In some non-limiting embodiments of the present technology, the server 202 can be configured to: (i) generate the additional trajectories; (ii) add the additional trajectories to the plurality of trajectories, adjusting the numbers of trajectories for each of the predetermined plurality of behavior clusters 302, thereby generating an augmented plurality of trajectories of the augmented dataset having the target distribution 500.

In other non-limiting embodiments of the present technology, using the predictive model, the server 202 can be configured to generate all the trajectories for the augmented plurality of trajectories corresponding to the target distribution 500. In other words, in these embodiments, the server 202 can be configured to synthetically generate every trajectory in the augmented plurality of trajectories.

In some non-limiting embodiments of the present technology, prior to including the given additional trajectory in the augmented plurality of trajectories, the server 202 can be configured to analyze the given additional trajectory to determine if the given additional trajectory conforms to a plurality of quality rules, as described in detail above with reference to FIGS. 6A and 6B.

The method 700 hence advances to step 712.

Step 712: Training a Motion Planner Model to Simulate Motion of the Autonomous Vehicle Based on the Augmented Dataset Instead of the Original Dataset At step 712, according to certain non-limiting embodiments of the present technology, using the augmented dataset generated at step 710, the server 202 can be configured to execute the motion planner model training procedure 210, described above, to train the motion planner model to simulate motion of the autonomous vehicle.

Thus, certain embodiments of the method 700 allow training the motion planner model to simulate the motion of the vehicle more comprehensively. This can enable to model more hypothetical traffic scenarios of navigating the autonomous vehicle, thereby mitigating risks of accidents thereof or improving its passengers' comfort.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for motion planning of an autonomous vehicle, the method comprising:

receiving an original dataset including a plurality of trajectories for the autonomous vehicle, a given trajectory of the plurality of trajectories being associated with a respective behavior of a predetermined plurality of behaviors;

the plurality of trajectories being distributed over the predetermined plurality of behaviors in the original dataset according to an initial distribution;

acquiring an indication of a target distribution of the plurality of trajectories over the predetermined plurality of behaviors;

determining a difference between the initial and target distributions, thereby identifying those of the predetermined plurality of behaviors, for which additional trajectories are to be generated for adjusting the initial distribution of the plurality of trajectories in the original dataset to the target distribution;

generating a given additional trajectory of the additional trajectories by:

acquiring an indication of a 3D scene for simulating motion of the autonomous vehicle along the given additional trajectory; and feeding the indication of the 3D scene along with an indication of one of the predetermined plurality of behaviors associated with the given additional trajectory to a predictive model, the predictive model has been pre-trained, based on the plurality of trajectories, to generate trajectories for input 3D scenes and one of the predetermined plurality of behaviors;

generating, using the plurality of trajectories in the original dataset and the additional trajectories, an augmented dataset having the target distribution of trajectories over the predetermined plurality of behaviors; and training a motion planner model to simulate motion of the autonomous vehicle based on the augmented dataset instead of the original dataset, wherein the target distribution has been determined so as to minimize bias of the motion planner model towards one of the predetermined plurality of behaviors.

2. The method of claim 1, further comprising pre-training the predictive model, the pre-training comprising:

generating a training set of data including a plurality of training digital objects, a given training digital object of which includes: (i) a training 3D scene; (ii) an indication of a desired training behavior; and (iii) a respective label including the given trajectory of the plurality of trajectories from the original dataset;

feeding the given training digital object of the plurality of training digital objects to the predictive model; and minimizing, at a current training iteration, a difference between a predicted trajectory and the respective label.

3. The method of claim 1, wherein the predictive model comprises a Transformer-based model.

4. The method of claim 1, wherein prior to the using the generating the augmented dataset, the method further comprises:

analyzing the given additional trajectory to determine whether the given additional trajectory conforms to a plurality of quality rules;

in response to determining that the given additional trajectory conforms to each one of the plurality of quality rules, using the given additional trajectory for the generating the augmented dataset; and in response to the given additional trajectory not conforming to at least one of the plurality of quality rules, removing the given additional trajectory from further consideration.

5. The method of claim 4, wherein the plurality of quality rules includes rules that are indicative of at least one of: (i) traffic safety of the given additional trajectory; (ii) kinematic feasibility of the given additional trajectory; and (iii) whether the given additional trajectory includes collisions of the autonomous vehicle with other objects.

6. The method of claim 1, wherein the acquiring the indication of the target distribution comprises determining the target distribution in accordance with a following equation:

$$freq_i^{new} = \text{dataset size} \cdot \frac{\sqrt{freq_i^{old}}}{\sum_{i=0}^{N} \sqrt{freq_i^{old}}},$$

where $freq_i^{new}$ is a frequency of appearance of trajectories associated with a given behavior of the predetermined plurality of behaviors in the augmented plurality of trajectories;

dataset size is a total number of trajectories in the plurality of trajectories;

$freq_i^{old}$ is a frequency of appearance of trajectories associated with a given behavior of the predetermined plurality of behaviors in the plurality of trajectories; and N is a total number of behaviors in the predetermined plurality of behaviors.

7. The method of claim 1, wherein the acquiring the indication of the target distribution comprises determining the target distribution in accordance with a following equation:

$$freq_i^{new} = \frac{\sum_{i=0}^{N} \sqrt{freq_i^{old}}}{\text{dataset size}}.$$

8. The method of claim 1, wherein the generating the augmented dataset comprises replacing the given trajectory of the plurality of trajectories with the given additional trajectory.

9. The method of claim 1, wherein the generating the augmented dataset comprises adding the given additional trajectory to the plurality of trajectories.

10. The method of claim 1, wherein the motion planner model comprises a recurrent neural network (RNN).

11. A system for motion planning of an autonomous vehicle, the system comprising at least one processor and at least one non-transitory computer-readable memory storing executable instructions, which, when executed by the at least one processor, cause the system to:

receive an original dataset including a plurality of trajectories for the autonomous vehicle, a given trajectory of the plurality of trajectories being associated with a respective behavior of a predetermined plurality of behaviors;

the plurality of trajectories being distributed over the predetermined plurality of behaviors in the original dataset according to an initial distribution;

acquire an indication of a target distribution of the plurality of trajectories over the predetermined plurality of behaviors;

determine a difference between the initial and target distributions, thereby identifying those of the predetermined plurality of behaviors, for which additional trajectories are to be generated for adjusting the initial distribution of the plurality of trajectories in the original dataset to the target distribution;

generate a given additional trajectory of the additional trajectories by:

acquiring an indication of a 3D scene for simulating motion of the autonomous vehicle along the given additional trajectory; and feeding the indication of the 3D scene along with an indication of one of the predetermined plurality of behaviors associated with the given additional trajectory to a predictive model, the predictive model has been pre-trained, based on the plurality of trajectories, to generate trajectories for input 3D scenes and one of the predetermined plurality of behaviors;

generate, using the plurality of trajectories in the original dataset and the additional trajectories, an augmented dataset having the target distribution of trajectories over the predetermined plurality of behaviors; and train a motion planner model to simulate motion of the autonomous vehicle based on the augmented dataset instead of the original dataset, wherein the target distribution has been determined so as to minimize bias of the motion planner model towards one of the predetermined plurality of behaviors.

12. The system of claim 11, wherein the at least one processor further causes the system to pretrain the predictive model, by:

generating a training set of data including a plurality of training digital objects, a given training digital object of which includes: (i) a training 3D scene; (ii) an indication of a desired training behavior; and (iii) a respective label including the given trajectory of the plurality of trajectories from the original dataset;

feeding the given training digital object of the plurality of training digital objects to the predictive model; and minimizing, at a current training iteration, a difference between a predicted trajectory and the respective label.

13. The system of claim 11, wherein the predictive model comprises a Transformer-based model.

14. The system of claim 11, wherein prior to the using the generating the augmented dataset, the at least one processor further causes the system to:

analyze the given additional trajectory to determine whether the given additional trajectory conforms to a plurality of quality rules;

in response to determining that the given additional trajectory conforms to each one of the plurality of quality rules, use the given additional trajectory for the generating the augmented dataset; and in response to the given additional trajectory not conforming to at least one of the plurality of quality rules, remove the given additional trajectory from further consideration.

15. The system of claim 14, wherein the plurality of quality rules includes rules that are indicative of at least one of: (i) traffic safety of the given additional trajectory; (ii) kinematic feasibility of the given additional trajectory; and (iii) whether the given additional trajectory includes collisions of the autonomous vehicle with other objects.

16. The system of claim 11, wherein to acquire the indication of the target distribution, the at least one processor causes the system to determine the target distribution in accordance with a following equation:

$$freq_i^{new} = \text{dataset size} \cdot \frac{\sqrt{freq_i^{old}}}{\sum_{i=0}^{N}\sqrt{freq_i^{old}}},$$

where $freq_i^{new}$ is a frequency of appearance of trajectories associated with a given behavior of the predetermined plurality of behaviors in the augmented plurality of trajectories;

dataset size is a total number of trajectories in the plurality of trajectories;

$freq_i^{old}$ is a frequency of appearance of trajectories associated with a given behavior of the predetermined plurality of behaviors in the plurality of trajectories; and N is a total number of behaviors in the predetermined plurality of behaviors.

17. The system of claim 11, wherein to acquire the indication of the target distribution, the at least one processor causes the system to determine the target distribution in accordance with a following equation:

$$freq_i^{new} = \frac{\sum_{i=0}^{N}\sqrt{freq_i^{old}}}{\text{dataset size}}.$$

18. The system of claim 11, wherein to generate the augmented dataset, the at least one processor causes the system to add the given additional trajectory to the plurality of trajectories.

* * * * *